Figure 1:
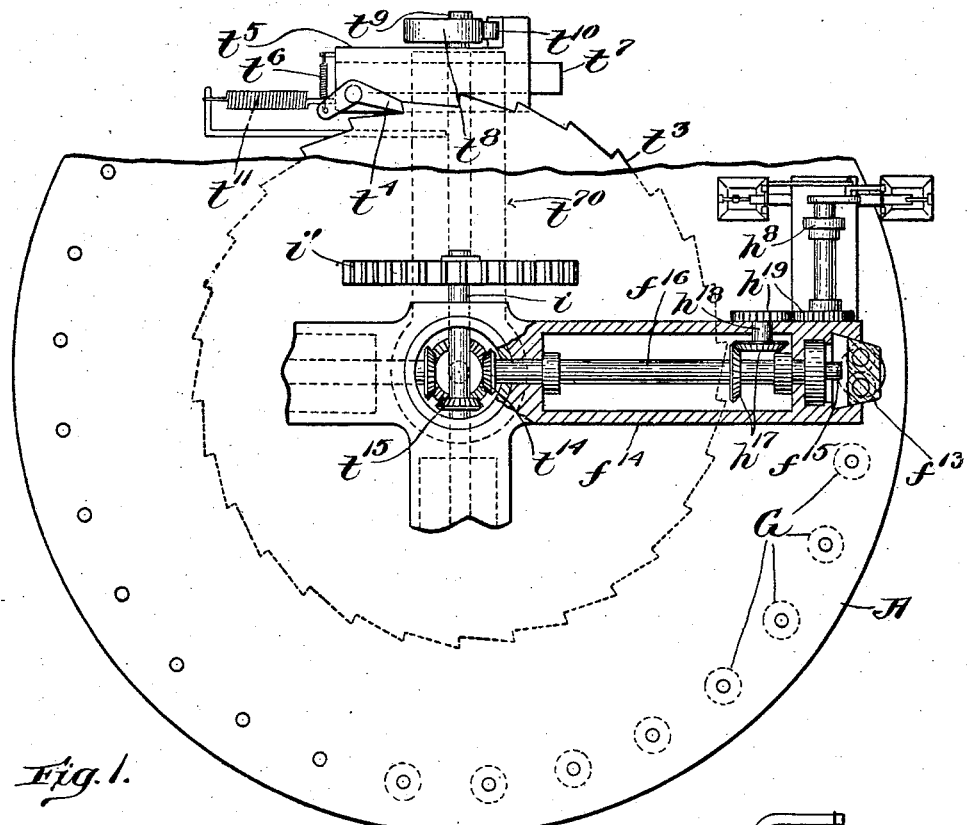

No. 854,697. PATENTED MAY 21, 1907.
N. MARSHALL.
ASSEMBLING APPARATUS.
APPLICATION FILED APR. 23, 1906.

2 SHEETS—SHEET 1.

Witnesses:
Katharine A. Dugan
Geo. N. Goddard

Inventor:
Norman Marshall
by Ira L. Fish
Attorney.

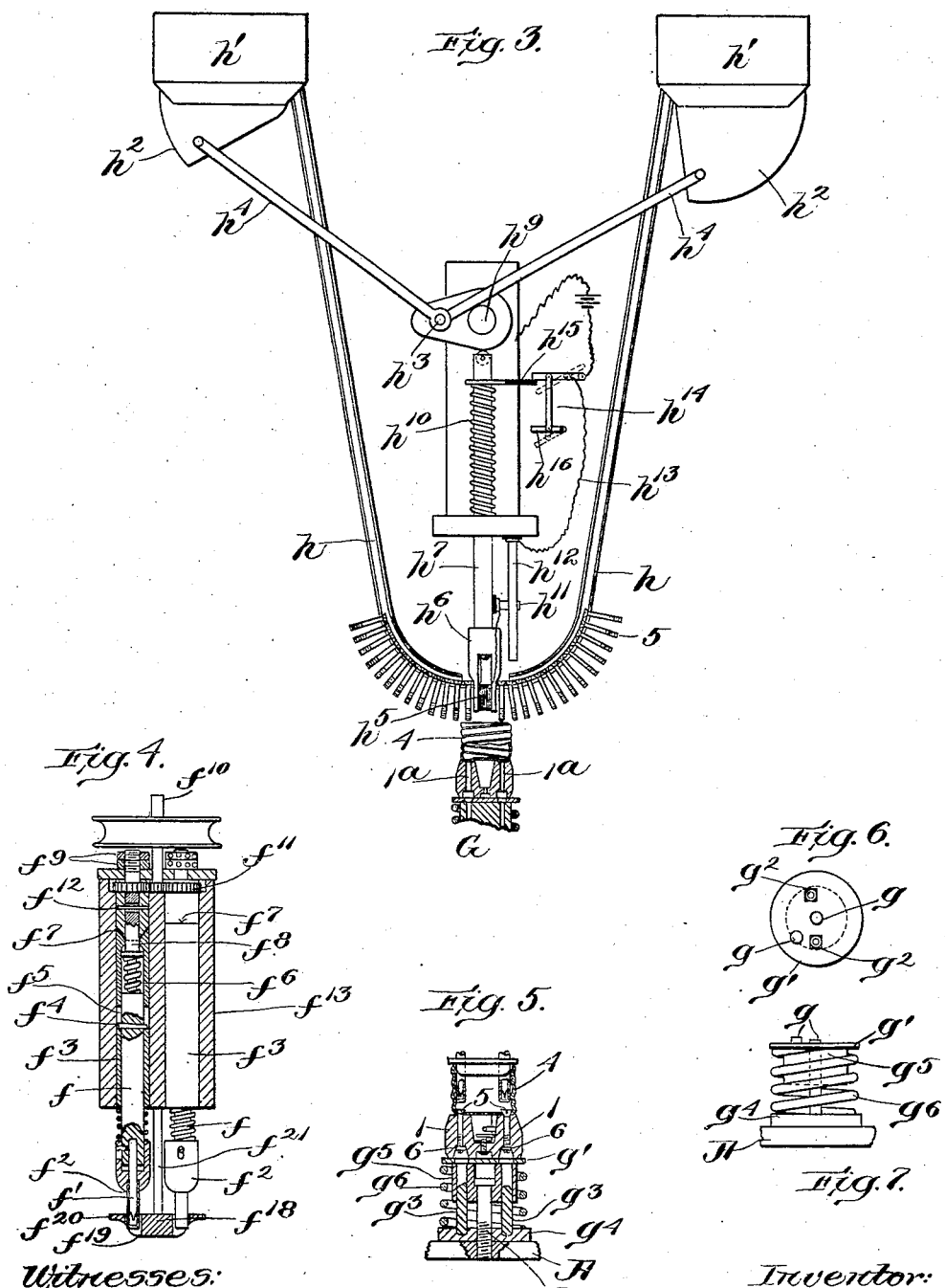

UNITED STATES PATENT OFFICE.

NORMAN MARSHALL, OF NEWTON, MASSACHUSETTS.

ASSEMBLING APPARATUS.

No. 854,697.   Specification of Letters Patent.   Patented May 21, 1907.

Original application filed January 19, 1905, Serial No. 241,884. Divided and this application filed April 23, 1906. Serial No. 313,102.

*To all whom it may concern:*

Be it known that I, NORMAN MARSHALL, a citizen of the United States, and a resident of Newton, county of Middlesex, Massachusetts, have invented certain new and useful Improvements in Assembling Apparatus, of which the following is a specification.

The invention relates to a machine or apparatus for use in assembling the parts of electric devices such for instance as switches, lamp sockets, cut-outs, etc., and its object is to provide for the rapid and economical assembling and securing together of the parts of the device being operated upon.

In practicing the invention the operation of driving the screws for securing the parts together is performed automatically while the parts to be secured together are supported and carried by a series of jigs. The screws by which the parts are secured together are automatically fed and delivered into the recesses for receiving them. The jigs are so mounted and moved that they travel successively first into position to receive the screw or screws by which the parts are to be secured together and then into position where the screw or screws are operated upon by the screw driving mechanism, the screw delivering mechanism and the screw driving mechanism operating to deliver and drive the screws during the interval between successive movements of the carrier on which the jigs are mounted.

In embodying the broader features of the invention in a machine especially adapted for use in assembling parts which are to be secured together by a plurality of screws, I have employed certain further features of invention for increasing the rapidity with which such parts may be secured together.

For the purpose of illustrating the various features of the invention I have shown in the accompanying drawings a mechanism designed more especially for use in assembling parts of an incandescent lamp socket and have shown this mechanism as forming a part of a machine in which other operations incident to the assembling of the parts of a socket are performed. The mechanism which I have shown for illustrating the various features of the invention is especially designed for assembling and securing together the screw shell of an incandescent lamp socket and the porcelain base and the parts are constructed and arranged to deliver and drive the two screws which are employed for securing the screw shell to the base and the jigs for carrying the parts are especially designed to maintain the nuts into which the screws are driven and the porcelain base in proper relation so that when the screws are delivered to the recesses in the shells and porcelain base they will register with the nuts.

Figure 2:
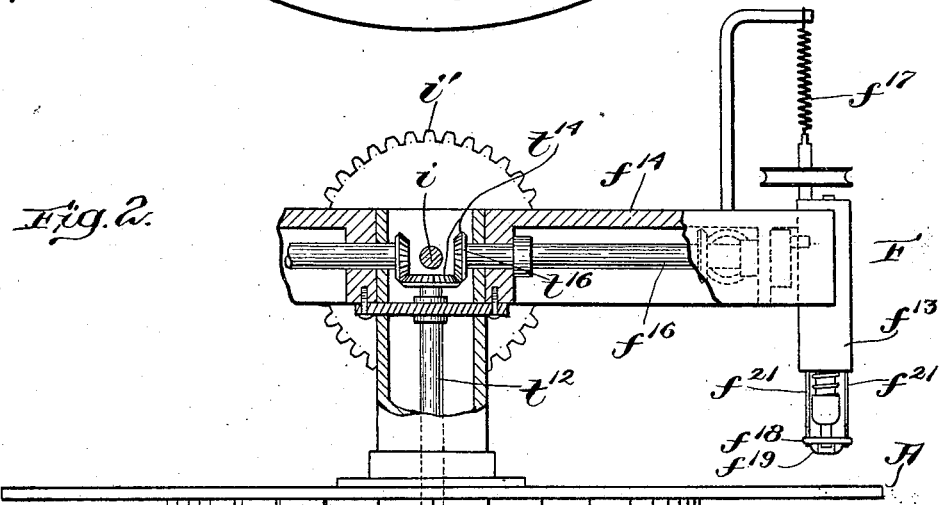

In the drawings—Figure 1 is a plan view of so much of the machine as is required to illustrate the mechanisms embodying the features of the present invention. Fig. 2 is an elevation partly in section. Fig. 3 is an enlarged detail view showing the screw feeding and delivering mechanism. Fig. 4 is an enlarged sectional elevation of the screw driving mechanism; and Figs. 5, 6 and 7 are details of one of the jigs for supporting the parts.

In the machine illustrated in the drawings the screws for securing the screw shell to the porcelain base of a socket are driven by a screw driving mechanism indicated at F in Fig. 2, to which the parts to be assembled and secured together are presented by a series of jigs, one of which is indicated at G in Fig. 3. These jigs are secured in a circular series upon a horizontal table A arranged below the screw driving mechanism and intermittently rotated to bring the jigs successively into position beneath the screw driving mechanism. Each of the jigs G comprises a plate $g'$ adapted to support the porcelain base 1 of the socket and this plate is provided with two pins $g$ projecting upward and arranged to engage the central recess in the base and one of the slots provided in the periphery of the base for the passage of the line wire. The square nuts 6 are positioned in proper relation to the base by means of recesses $g^2$ formed in the plate $g'$. The bottoms of the recesses are formed by rods $g^3$ projecting upward from the base plate $g^4$ of the jig and extending through the block $g^5$ on which the plate $g'$ is secured. The carrying plate $g'$ of the jig is yieldingly supported upon the spring $g^6$ so that the porcelain base may pass downward as the screws 5 which secure the screw shell to the base are screwed into the nuts 6. During the downward movement of the porcelain base as the screws 5 are screwed into the nuts 6, the rods $g^3$ will pass up into the recesses $6^a$ thus following the nuts 6 as the screws 5 are driven into them. The block $g^5$ and plate $g'$ are held in normal position against the tension of the spring $g^6$ by means of a bolt $g^7$ screwed into the base plate $g^4$ and having its head playing in a recess in the block.

During the operation of the machine the table A is intermittently advanced and during the intervals between the advance movements of the table the operator places the nuts 6 in the recesses $g^2$ and then places the porcelain base 1 in position upon the jig. The operator also places the screw shell 4 in position on the porcelain base. The shell is maintained in proper position upon the base by means of the projecting edges of the metal around the screw holes which enters the countersunk ends of the holes or recesses $1^a$ in the base. After the parts have been placed upon the jigs G as above indicated they are successively brought by the travel of the table A into position to receive the screws 5. The screws 5 are supplied to oppositely arranged guide chutes $h$ from hoppers $h'$ by means of vibrating separator plates $h^2$ which are continuously vibrated by means of a crank pin $h^3$ connected with the plates by links $h^4$.

The screws 5 at the ends of the guide chutes are separated from the series of screws in the guideways and transferred to the holes $1^a$ in the porcelain base by means of an electro-magnet $h^5$ carried by a block $h^6$ which reciprocates between the ends of the guide chutes. The block $h^6$ is secured to the lower end of a bar $h^7$ mounted in suitable guideways and operated by a cam $h^8$ secured to the end of a constantly rotating shaft $h^9$. The upper end of the bar $h^7$ is held in engagement with the cam by means of a spring $h^{10}$.

When the block $h^6$ is in its upper position as indicated in Fig. 3, the electro-magnet $h^5$ is energized and attracts the two screws 5 at the ends of the guideways $h$. When the block $h^6$ descends these screws are carried down by the magnet while the sides of the block $h^6$ above the magnet retain the succeeding screws in the guideways. The downward movement of the block $h^6$ carries the screws 5 downward until their lower ends pass through the holes in the shell 4 and into the holes $1^a$ in the porcelain base. The magnet is then deënergized so that the screws are released and drop freely into the holes $1^a$. The block $h^6$ then returns to its upper position and as it reaches its upper position the magnet $h^5$ is again energized to attract the screws 5 at the end of the guide chutes.

Any suitable devices for causing the magnet to be energized and deënergized at the proper times, may be employed and in Fig. 3 I have illustrated diagrammatically one form of such devices. As shown in this view one end of the magnet wire is connected with the source of electrical supply through the metallic parts of the mechanism, while the other end of the magnet wire is connected to an insulated contact finger $h^{11}$ which rides against an insulated contact bar $h^{12}$. The contact bar $h^{12}$ is connected with the source of electrical supply through a connection $h^{13}$ in which is introduced a switch $h^{14}$. As the bar $h^7$ reaches its upper position an arm $h^{15}$ projecting from said bar operates the switch $h^{14}$ to close the electric circuit, thus energizing the magnet $h^5$. When the bar $h^7$ reaches it lower position, the arm $h^{15}$ engages a lever $h^{16}$ connected with the switch $h^{14}$ and operates the switch to open the electric circuit and deënergize the magnet and the switch remains open until again closed by the arm $h^{15}$ as the bar $h^7$ and block $h^6$ reach their upper position. By this mechanism the two screws 5 are accurately fed into proper position in the holes $1^a$ of the porcelain base as each jig G is brought into position under the block $h^6$ and remains there during the interval between successive movements of the table A.

The screw driving mechanism for driving the screws 5 and thus securing the shell 4 to the porcelain base 1, is shown in Figs. 2 and 4. As shown in these figures this screw driving mechanism is provided with two spindles $f$ each carrying a screw driver $f'$ and each provided with a spring pressed guard sleeve $f^2$. The spindles $f$ are secured to driving shafts $f^3$ by means of pins $f^4$ passing through the spindle and engaging longitudinal slots $f^5$ in the shaft and each spindle is held yieldingly in position with the pin $f$ against the lower end of the slots by a spring $f^6$. The shaft $f^3$ is made in two sections frictionally connected together by a friction bearing $f^7$. The lower section of the shaft is forced against the upper section by means of a bolt $f^8$ passing upward through the upper section of the shaft and provided with adjusting and lock nuts $f^9$ upon its upper end. The upper section of the shaft is continuously driven from a pulley shaft $f^{10}$ with which it is connected by gearing $f^{11}$. The upper section of the shaft and the bolt $f^8$ are connected to rotate in unison by means of a pin $f^{12}$ passing through the shaft and through a slot in the bolt. By this construction the spindles $f$ are independently driven and each spindle may continue to act upon the corresponding screw until that screw has been properly tightened when that spindle may cease to rotate by reason of the frictional connection between the sections of its driving shaft, while the other spindle may continue to rotate until the corresponding screw has been driven home.

The spindle driving shafts and pulley shaft $f^{10}$ are mounted in a slide $f^{13}$ guided in ways formed in the overhanging arm $f^{14}$ which projects laterally from the central standard of the machine. This slide $f^{13}$ is reciprocated by means of a crank pin $f^{15}$ carried by the constantly rotating shaft $f^{16}$ and engaging a transverse slot in the back of the slide, the slide being forced yieldingly upward by a spring $f^{17}$ (Fig. 2).

The screw shell 4 is held firmly in position during the operation of the screw driving mechanism F upon the screws 5 by means of a centering and positioning plate $f^{18}$ which is provided with a downwardly extending projection $f^{19}$ for fitting within the screw shell and with an annular flange $f^{20}$ for engaging the upper edge of the screw shell. This plate $f^{18}$ is carried by rods $f^{21}$ which extend up into the slide $f^{13}$ and the plate is held yieldingly in normal position by its weight. When the slide $f^{13}$ descends the plate $f^{18}$ is brought against the end of the screw shell 4 carried by the jigs G then in position under the screw driving mechanism, thereby accurately positioning the screw shell with relation to the screw driving spindles. During the continued downward movement of the slide $f^{13}$ the plate rides up the rods $f^{21}$ to allow the slide and the screw driving spindle carried thereby to move downward with relation to the plate $f^{18}$ so that the plate acts to hold the shell in position during the driving of the screws 5.

The shaft $h^9$ which operates the screw delivering mechanism is continuously driven from the shaft $f^{16}$ by means of bevel gears $h^{17}$ which connect the shaft $f^{16}$ with a short shaft $h^{18}$ which is in turn connected by gearing $h^{19}$ with the shaft $h^9$. The shaft $f^{16}$ is driven from a shaft $i$ through a bevel gear $t^{15}$ secured to the shaft $i$ and engaging a gear $t^{14}$ which is secured to a vertical shaft $t^{12}$ and engages a gear $t^{16}$ on the shaft $f^{16}$. The shaft $i$ is provided with a gear $i'$ through which the shaft may be connected to any suitable source of power.

The intermittent movements are imparted to the table A through a ratchet wheel $t^3$ secured to the under side of the table and having a number of teeth corresponding to the number of jigs on the table. This ratchet wheel is acted upon by a pawl $t^4$ which is pivoted to a slide $t^5$ and is held in engagement with the ratchet wheel by a spring $t^6$. The slide is guided and supported upon a bar $t^7$ carried by an arm $t^{70}$ which projects from the center standard of the machine. The slide is reciprocated by a cam $t^8$ which is secured to a shaft $t^9$ and is engaged by a roll $t^{10}$ carried by the slide and held in engagement with the cam by a spring $t^{11}$. The shaft $t^9$ is continuously driven from the vertical shaft $t^{12}$ through the gears $t^{13}$.

While I have shown the various features of my invention embodied in a mechanism constructed and arranged to simultaneously deliver a plurality of screws to recesses in the parts carried by the supporting jigs and provided with screw driving mechanism constructed to simultaneously drive a plurality of screws, it will be understood that the broader features of the invention are not limited in their application to mechanisms constructed to simultaneously operate upon a plurality of screws and it will be also understood that those features of invention relating to the feeding and driving of a plurality of screws may be embodied in mechanisms differing in construction and arrangement from the mechanisms illustrated and described. It will also be understood that various changes and modifications may be made in embodying the features of invention in different forms of machines best suited to the requirements and conditions under which the machine is to operate and best adapted for the special character of the work to be done.

Without attempting to set forth in detail the various constructions and modifications in which the features of my invention may be embodied, what I claim and desire to secure by Letters Patent is:—

1. An assembling apparatus comprising a screw driving mechanism, a series of work carrying jigs, screw feeding mechanism, mechanism for bringing the jigs successively to the screw feeding mechanism and then to the screw driving mechanism, and mechanism for intermittently operating the screw driving mechanism.

2. An assembling apparatus comprising a screw driving mechanism, screw feeding mechanism, and devices for presenting the work successively to the screw feeding mechanism and then to the screw driving mechanism.

3. An assembling apparatus comprising a work support, screw feeding mechanism for delivering a screw to a recess in the work, a screw driving mechanism, and means for moving the work support from the screw feeding mechanism to the screw driving mechanism.

4. An assembling apparatus comprising a screw driving mechanism, a work carrying jig, screw feeding mechanism, and means for bringing the jig to the screw feeding mechanism and then to the screw driving mechanism.

5. An assembling apparatus comprising mechanism for simultaneously operating upon two screws, a series of jigs for carrying the parts to be assembled and presenting them to said mechanism, mechanism for intermittently advancing said series of jigs, and mechanism for feeding two screws to the parts to be assembled.

6. An assembling apparatus comprising mechanism for operating upon a plurality of screws, a series of jigs for carrying the parts to be assembled, mechanism for intermittently advancing said jigs, and mechanism for feeding a plurality of screws to the parts to be assembled.

7. An assembling apparatus comprising a screw driving mechanism provided with a plurality of screw driving spindles, a series of jigs provided with devices for holding the parts to be assembled in proper relation, mechanism for feeding a plurality of screws to the parts to be assembled, and mechanism for bringing the jigs successively to the screw driving mechanism.

8. An assembling apparatus comprising a screw driving mechanism provided with two screw driving spindles, a series of jigs provided with devices for holding the base and screw shell securing nuts in proper relation, mechanism for simultaneously feeding the shell securing screws to the base, mechanism for successively bringing the jigs to the screw feeding mechanism and to the screw driving mechanism, and mechanism for intermittently operating the screw driving mechanism.

In witness whereof I have hereunto set my hand, this 21st day of April 1906.

NORMAN MARSHALL.

In the presence of—
IRA L. FISH,
KATHARINE A. DUGAN.